(12) United States Patent
Schwamberger et al.

(10) Patent No.: US 11,996,750 B2
(45) Date of Patent: May 28, 2024

(54) ELECTRICAL CONTACTING OF STATOR TERMINALS ON A PRINTED CIRCUIT BOARD USING HORIZONTALLY ALIGNED INSULATION DISPLACEMENT CONTACTS

(71) Applicant: NIDEC GPM GmbH, Auengrund ot Merbelsrod (DE)

(72) Inventors: Frank Schwamberger, Schleusingen (DE); Jakob Schnitzer, Hilburghausen (DE); Conrad Nickel, Troistedt (DE)

(73) Assignee: NIDEC GPM GMBH, Auengrund ot Merbelsrod (DE)

(*) Notice: Subject to any disclaimer, the term of this patent is extended or adjusted under 35 U.S.C. 154(b) by 357 days.

(21) Appl. No.: 17/430,412

(22) PCT Filed: Feb. 25, 2020

(86) PCT No.: PCT/EP2020/054854
§ 371 (c)(1),
(2) Date: Aug. 12, 2021

(87) PCT Pub. No.: WO2020/173913
PCT Pub. Date: Sep. 3, 2020

(65) Prior Publication Data
US 2022/0149689 A1    May 12, 2022

(30) Foreign Application Priority Data
Feb. 25, 2019   (DE) .................. 102019104706.4

(51) Int. Cl.
*H02K 3/50* (2006.01)
*H02K 3/38* (2006.01)
*H02K 5/22* (2006.01)

(52) U.S. Cl.
CPC ............... *H02K 3/50* (2013.01); *H02K 3/38* (2013.01); *H02K 5/225* (2013.01); *H02K 2203/03* (2013.01); *H02K 2211/03* (2013.01)

(58) Field of Classification Search
CPC .......... H02K 3/50; H02K 3/38; H02K 5/225; H02K 2203/03; H02K 2211/03; H02K 3/522
See application file for complete search history.

(56) References Cited

U.S. PATENT DOCUMENTS

| 2007/0170792 A1 | 7/2007 | Bott et al. |
| 2017/0125928 A1 | 5/2017 | Winheim et al. |

(Continued)

FOREIGN PATENT DOCUMENTS

| DE | 10012885 A1 * | 10/2001 | ........... H01R 12/675 |
| DE | 10221843 A1 * | 12/2003 | ......... F04D 13/0673 |

(Continued)

OTHER PUBLICATIONS

English translation of DE-102011121943-A1 (Year: 2013).*
(Continued)

*Primary Examiner* — Tulsidas C Patel
*Assistant Examiner* — Joshua Kiel M Rodriguez
(74) *Attorney, Agent, or Firm* — Keating & Bennett, LLP

(57) ABSTRACT

A pump includes an electric motor with a rotor mounted rotatably about an axis of rotation and circumferentially surrounding a stator that includes a stator core and coils wound on the stator core. The windings are defined by a winding wire with winding wire end sections electrically contacted directly with a printed circuit board at an end surface through insulation displacement contacts each including at least one opening for insertion of a winding wire end section, the at least one opening being a slot extending parallel or substantially parallel to a surface of the printed circuit board.

22 Claims, 5 Drawing Sheets

(56) References Cited

U.S. PATENT DOCUMENTS

2017/0302129 A1    10/2017  Yamada et al.
2021/0044184 A1     2/2021  Guardiola

FOREIGN PATENT DOCUMENTS

| DE | 10 2011 112 821 A1 |   | 3/2013 |
| DE | 10 2011 121 943 A1 |   | 6/2013 |
| DE | 10 2017 206 189 A1 |   | 10/2017 |
| DE | 10 2016 224 526 A1 |   | 6/2018 |
| DE | 10 2018 102 976 A1 |   | 8/2019 |
| EP | 1 324 465 A2 |   | 7/2003 |
| JP | 2010-154701 A |   | 7/2010 |
| KR | 101113531 B1 | * | 2/2012 |
| KR | 1525540 B1 | * | 6/2015 |
| WO | 2004/114502 A1 |   | 12/2004 |

OTHER PUBLICATIONS

English translation of DE-10221843-A1 (Year: 2003).*
English translation of DE-10012885-A1 (Year: 2001).*
English translation of KR-10-1525540-B1 (Year: 2015).*
Official Communication issued in International Patent Application No. PCT/EP2020/054854, issued on Aug. 25, 2021.
English translation of Official Communication issued in International Patent Application No. PCT/EP2020/054854, mailed on Jun. 4, 2020.
Official Communication issued in International Patent Application No. PCT/EP2020/054854, mailed on Jun. 4, 2020.

* cited by examiner

ELECTRICAL CONTACTING OF STATOR TERMINALS ON A PRINTED CIRCUIT BOARD USING HORIZONTALLY ALIGNED INSULATION DISPLACEMENT CONTACTS

CROSS REFERENCE TO RELATED APPLICATIONS

This is a U.S. national stage of PCT Application No. PCT/EP2020/054854, filed on Feb. 25, 2020, and with priority under 35 U.S.C. § 119(a) and 35 U.S.C. § 365(b) being claimed from German Application No. 102019104706.4, filed Feb. 25, 2019; the entire disclosures of which are hereby incorporated herein by reference.

1. FIELD OF THE INVENTION

The present disclosure relates to a pump, an electric motor, and a method of electrically contacting a stator to a printed circuit board.

2. BACKGROUND

Pumps often feature DC motors. The DC motors include a rotor connected to a motor shaft and rotatably mounted in a housing. The rotor is provided with permanent magnets. A stator is arranged in the rotor, which carries a number of windings on an iron core. When suitably controlled, the windings generate a magnetic field that drives the rotor to rotate. The windings are usually wound in three phases and are accordingly provided with three electrical connections through which the windings can be connected to a control unit (ECU). At low power levels, busbars in the form of conductor foils can be used. For higher powers, the winding connection wires are contacted via busbars made of copper sheet. It is also known to connect the winding connection wires directly to the printed circuit board through insulation displacement contacts.

A cooling fan motor is known from DE 10 2011 112 821 A1, the stator windings of which are electrically contacted on a printed circuit board through insulation displacement contacts. The insulation displacement contacts are U-shaped. They run parallel to the direction of rotation, which is why the end of the coil is inserted into the insulation displacement contact in the axial direction during assembly. During press-fitting, the area of the insulation displacement contacts must be accessible to the press-fitting tool, which has proved difficult in some cases.

SUMMARY

Example embodiments of the present disclosure provide cost-effective, simple, and space-saving solutions to provide connections between stators and printed circuit boards.

For the purpose of the geometric description of the pump or electric motor, the axis of rotation or longitudinal axis of the motor is assumed to be a central axis and an axis of symmetry. The rotor is arranged concentrically relative to the axis of rotation around the stator.

An example embodiment of the present disclosure includes a pump including an electric motor or an electric motor with a rotor rotatably supported about an axis of rotation and circumferentially surrounding a stator. The stator includes a stator core and coils wound on the stator core. The windings are defined by a winding wire including winding wire end sections are electrically contacted directly with a printed circuit board at the end surfaces through insulation displacement contacts each including at least one slot-shaped opening for insertion of a winding wire end section, the slot-shaped opening extending parallel or substantially parallel to the surface of the printed circuit board. An open end of the slot-shaped opening extends in or against the circumferential direction. In other words, the slot is perpendicular or approximately perpendicular to the axis of rotation.

The slot-shaped opening allows the winding wire end sections to be inserted into the insulation displacement contacts parallel or substantially parallel to the circuit board, which significantly simplifies the manufacturing process. The winding wire end sections are thus preferably pressed into the respective insulation displacement contact parallel or substantially parallel to the surface of the printed circuit board. Press-fitting is preferably performed tangentially to the insulation displacement contact on a circular path to the axis of rotation. Lateral contacting is an arrangement that can be easily implemented in terms of production technology using press-fit pliers.

Preferably, the insulation displacement contacts are soldered to the printed circuit board or connected to it through a press fit.

In an example embodiment of the present disclosure, the insulation displacement contacts are double insulation displacement contact elements with two insulation displacement connection terminals, which are preferably opposite to each other and accommodate the two winding wire end sections of a common phase. Preferably, the insulation displacement contacts are U-shaped in cross-section, with the slots being provided in the legs.

It is also possible that a single insulation displacement contact is used, into the opening of which two winding wire end sections are inserted one after the other.

It is advantageous if the stator and the printed circuit board are aligned with their upper and lower sides parallel or substantially parallel to each other.

Preferably, the winding wire end sections extend exclusively in the radial direction and in the direction of the axis of rotation. They can be of equal length or substantially equal length.

Furthermore, an example embodiment of a method of electrically contacting a stator of an electric motor, in particular a pump, with a printed circuit board is provided. The stator includes a stator core and coils wound on the stator core, the windings are defined by a winding wire with winding wire end sections and the winding wire end sections extend parallel or substantially parallel to a longitudinal axis of the pump. The method includes bending the winding wire end sections outward in the radial direction to the longitudinal axis, placing the stator with respect to the printed circuit board, with the printed circuit board and the stator aligned with their upper and lower sides parallel to each other, inserting ends of the winding wire end sections into insulation displacement contacts on the printed circuit board, and pressing the ends of the winding wire end sections into insulation displacement contacts on the printed circuit board parallel or substantially parallel to the surface of the printed circuit board.

The insulation displacement contacts are preferably designed as described above. Preferably, they are double insulation displacement contacts.

It is advantageous if press-fitting is carried out through a two-part press-fitting tool, the two tool parts of which are each fed from one side onto the double insulation displacement contact element to provide simultaneous press-fitting of two winding wire end sections of a common phase. This eliminates the need for additional support during the press-fitting process. Press-fitting is preferably performed tangentially to the insulation displacement contact, which is on a circular path relative to the axis of rotation.

Preferably, the individual phases are fastened by rotating the stator assembly (stator, circuit board, etc.) relative to the press-fit tool. The press-fit tool is thus brought specifically to the respective insulation displacement contact in order to carry out the previously described process. This process delivers high process reliability and can be easily automated.

The above and other elements, features, steps, characteristics and advantages of the present disclosure will become more apparent from the following detailed description of the example embodiments with reference to the attached drawings.

BRIEF DESCRIPTION OF THE DRAWINGS

Example embodiments of the present disclosure are explained in more detail below with reference to the drawings. Similar or similarly acting components are designated in the figures with the same reference signs.

DETAILED DESCRIPTION

Figure 1:
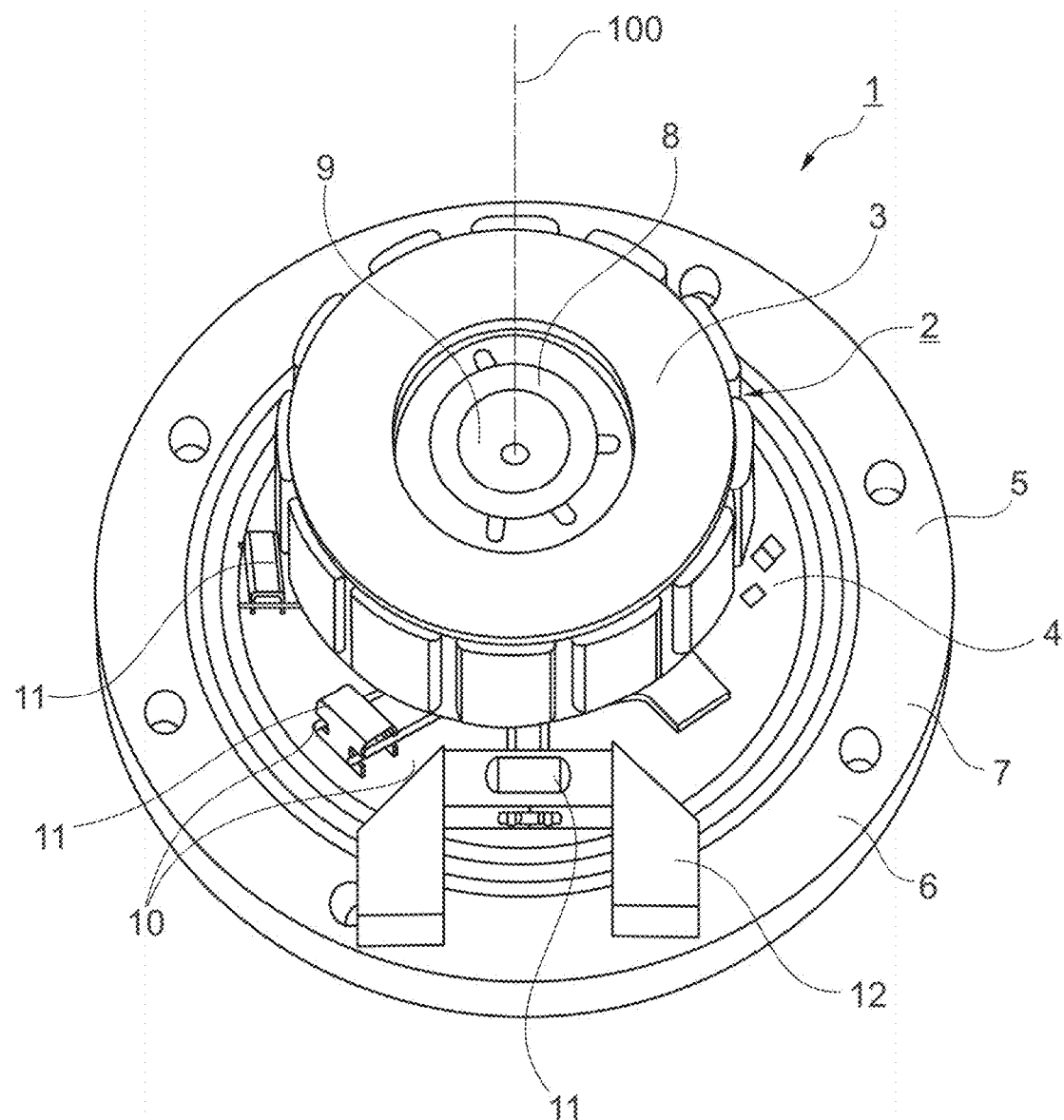
FIG. 1 is a top view of a stator and a printed circuit board of an electric motor of a pump during a first working step according to an example embodiment of the present disclosure.
Figure 2:
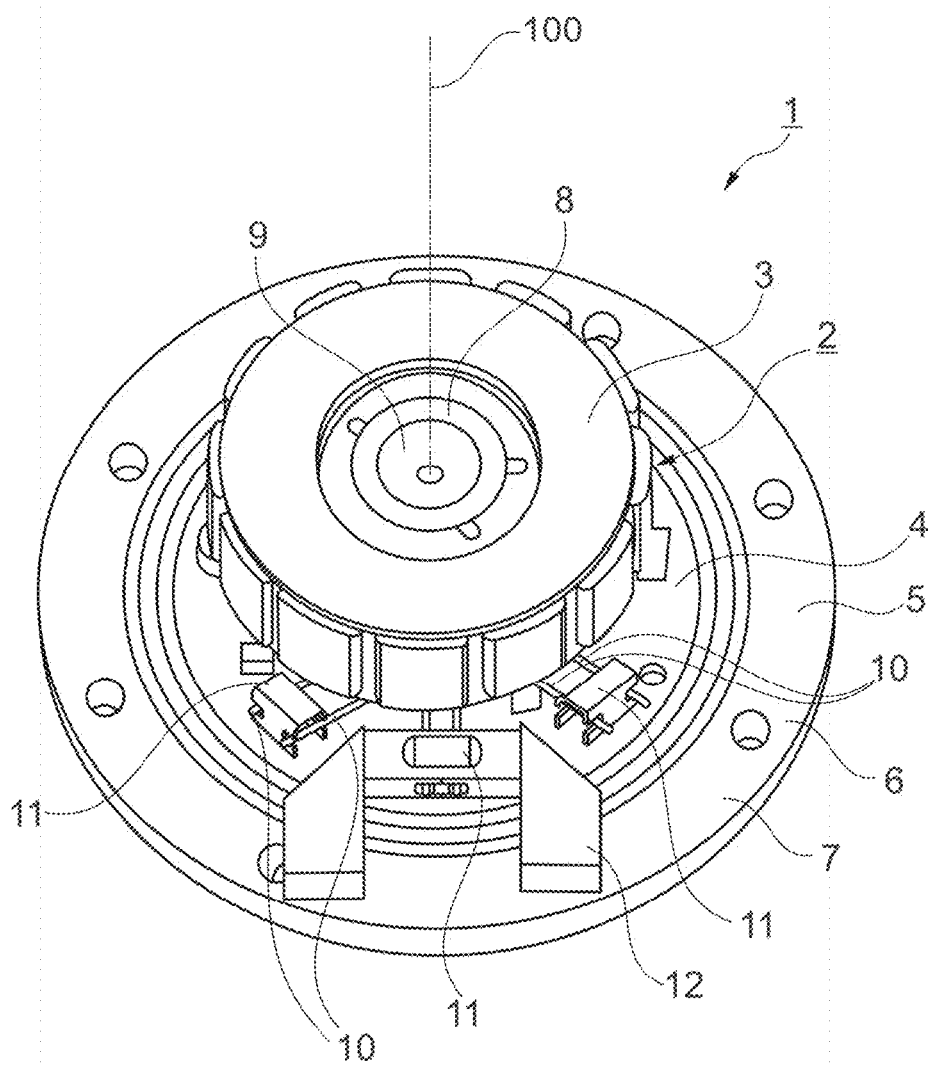
FIG. 2 is a top view of the arrangement of FIG. 1 during a second working step.
Figure 3:
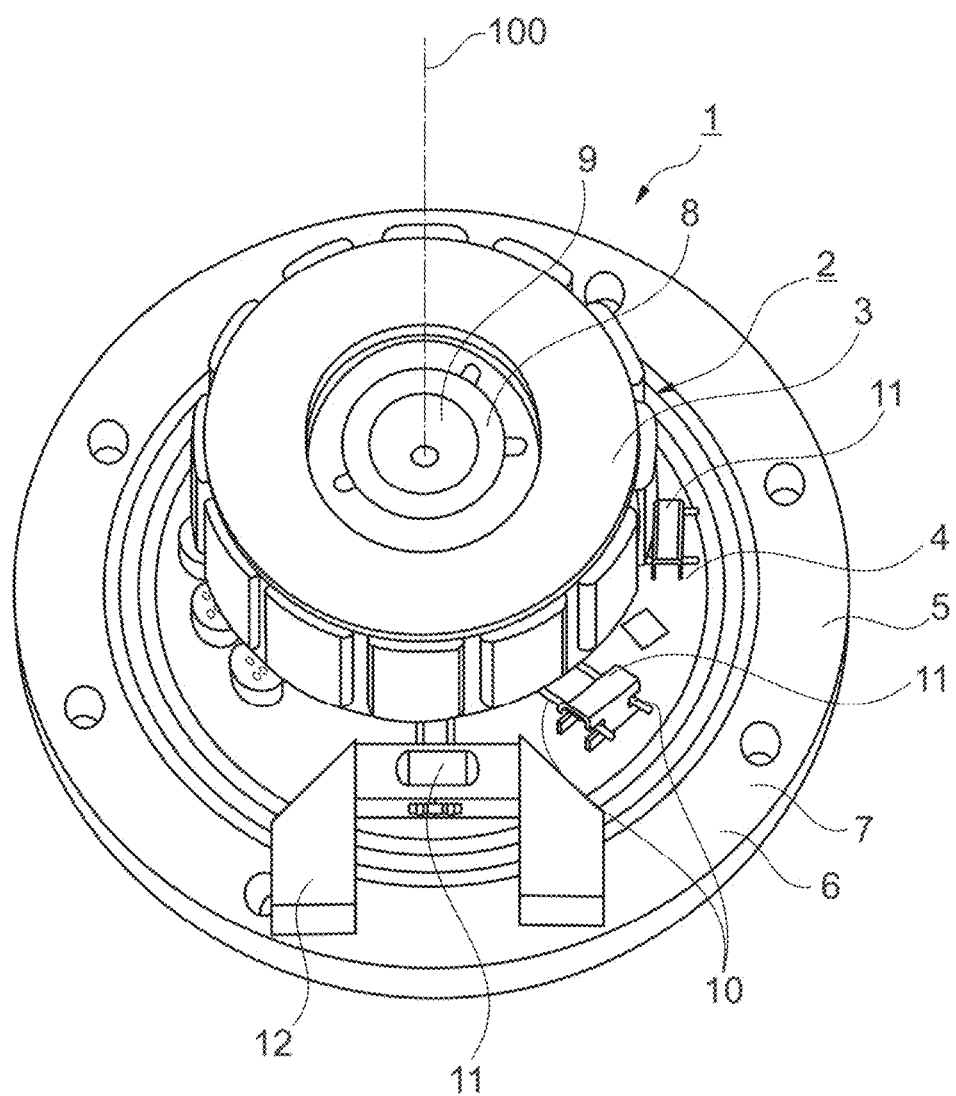
FIG. 3 is a top view of the arrangement of FIG. 1 during a third work step.

FIGS. 1 to 3 show a portion of a water pump 1 with an electric motor 2 including a stator 3. A rotor, which is not shown, surrounds the stator 3 concentrically to an axis of rotation 100. The rotor is connected to a motor shaft, which is not shown, for transmitting a torque. The pump 1 preferably is a dry rotor. The electric motor 2 preferably is a brushless DC motor. The stator 3 includes a stator core which extends coaxially with the axis of rotation 100 and includes a plurality of stator core segments, not shown, around each of which coils are wound. The coils are not shown. The windings are three-phase wound and are defined by a winding wire including winding wire end sections, and the winding wire end sections are electrically face-contacted with a printed circuit board 4. The stator 3 is fixedly mounted within a motor housing not shown, and is adapted to generate a time-varying magnetic field through the coils. The magnetized rotor surrounds the stator 3 circumferentially. It is adapted to be rotated by an interaction with the time-varying magnetic field generated by the coils. A pump housing 5 includes a housing part 6, which includes a base plate 7 and a dome 8 projecting centrally from the base plate 7. The base plate 7 and the dome 8 have a central opening 9 passing through them. The stator 3 sits firmly on the outside of the dome 8. The motor shaft, which is not shown, passes through the central opening of the housing part 9 and is rotatably mounted inside the dome 8. Seals, in particular mechanical seals, inside the dome 8 guarantee that the fluid to be pumped does not penetrate the electric motor 2. The motor housing sits indirectly or directly on the pump housing 5.

The winding wire end sections 10 extend radially outward from the stator 3. They are approximately the same length for all three phases. Insulation displacement contacts 11, in particular IDC, associated with each phase are arranged on the printed circuit board 4, in particular soldered on or press-fitted. During assembly, the stator 3 and the printed circuit board 4 are arranged in the same way in the circumferential direction about the longitudinal axes and thus without angular offset, i.e., the winding wire end sections 10 first extend parallel or substantially parallel to the axis of rotation 100 and are then angled perpendicular or approximately perpendicular thereto, where they then align along the radius. Bending of the winding wire end sections 10 in the circumferential direction is not provided. The stator 3 and the printed circuit board 4 are arranged with their upper and lower sides parallel or substantially parallel to each other.

Figure 5:
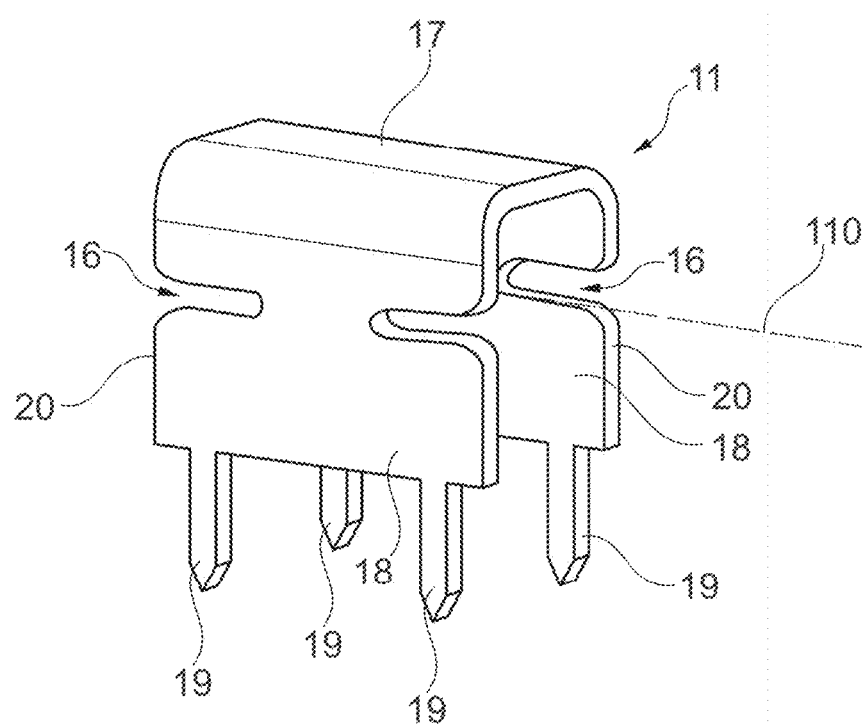
FIG. 5 is a spatial view of an insulation displacement contact element according to an example embodiment of the present disclosure.

The insulation displacement contacts 11 are double insulation displacement contact elements with two insulation displacement connection terminals, as shown in FIG. 5. In cross-section, the double insulation displacement contact element 11 is essentially U-shaped with two insulation displacement contacts 16 located at opposite ends. The double insulation displacement contact element 11 includes a connection area 17 and two legs 18 connected through the connection area. At the free ends of the legs 18, two contact pins 19 are spaced apart in each case, which in the installed state penetrate and make contact through the printed circuit board and are soldered thereto. It is also possible to establish an electrical connection with IDC contacts soldered flat on the printed circuit board without through-contacting.

The insulation displacement contacts 16 each include a slot which is introduced into the two legs 18 from one of the two end surfaces 20 and extend parallel or substantially parallel to the connection region 17. The winding wire end sections 10 are thus inserted and pressed parallel or substantially parallel to the surface of the printed circuit board 4. When the enamel-insulated winding wire end sections 10 are pressed into the insulation displacement contacts 11, the winding wires are cut by cutting edges and thus electrically connected to the printed circuit board 4 carrying the control electronics through the insulation displacement contacts 11. The double insulation displacement contact element 11 is arranged with the longitudinal axis 110 preferably in a tangential direction to a point on a circle around the axis of rotation 100.

Figure 4:
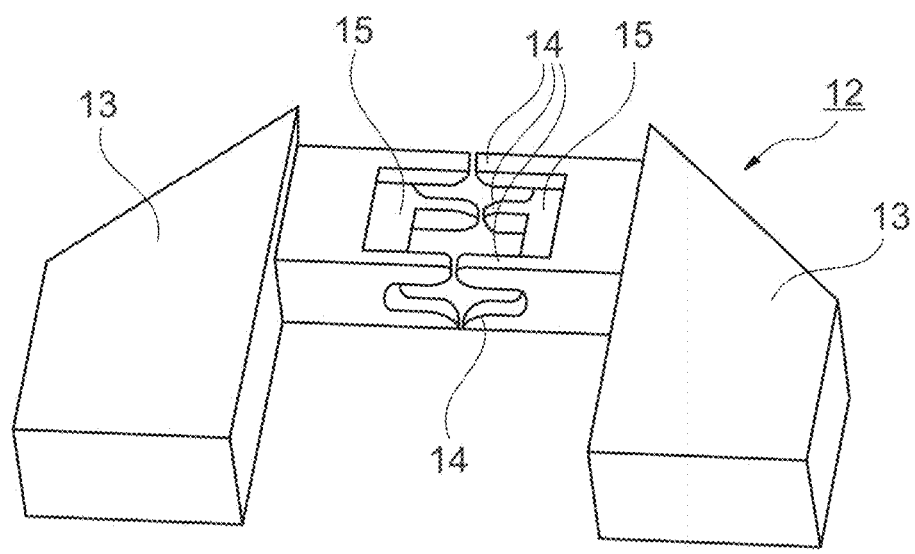
FIG. 4 is a spatial view of a press-fit tool according to an example embodiment of the present disclosure.

The press-fit tool 12 shown in detail in FIG. 4 includes two identical tool parts 13. The tool parts 13 each include four spaced projections 14 to receive and guide the winding wire. The projections 14 are arranged at the corners of a rectangle. On the bottom of the rectangle between the projections 14, a protrusion 15 is provided to press the winding wire into the respective insulation displacement contact. During the press-fit process, the press-fit tool is fed with a first tool part onto the winding wire end section located in the first opening, while the second tool part is fed onto the winding wire end section located in the second opening. The two tool parts thus press against each other, so that additional support is not necessary. In this way, electrical contact is made and the end of the coil is fixed to the printed circuit board in a single operation. Since the press-fit tool is moved in a plane parallel or substantially parallel to the surface of the printed circuit board, assembly is simplified. The stator 3 lies outside the insulation displacement contacts 11 when viewed from above the printed circuit board, i.e., it does not cover them. The contact area is therefore easily accessible for the press-fit tool 12. The press-fitting of all winding wire end sections of the three phases is carried out in three successive steps, which are shown in FIGS. 1 to 3. After a press-fit operation has been completed, the press-fit tool is released and the stator assembly is rotated through a defined angle of rotation relative to the press-fit tool and the press-fit operation is performed on the next double insulation displacement contact element. This process can be well automated and improves process reliability.

It is also possible to use a single-sided insulation displacement contact element per phase. In this case, the opening of the U-shaped contact element can point in or against the circumferential direction. The winding wire end sections are inserted one after the other into the opening and then pressed in through a press-fit tool. The press-fit tool includes a tool part which corresponds essentially to that described above. A second tool part is merely a support and engages the opposite, closed side of the contact element. Both tool parts are also moved in a plane parallel or substantially parallel to the surface of the printed circuit board during the press-fit process.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A pump, comprising:
an electric motor including a stator centered about an axis of rotation of the electric motor, the stator including a stator core and coils wound on the stator core, and the windings being defined by a winding wire with winding wire end sections; wherein
the winding wire end sections are electrically contacted with a printed circuit board on an end surface through electrically conductive insulation displacement contacts each including at least one opening for insertion of one of the winding wire end sections, the electrically conductive insulation displacement contacts and the stator core both being arranged above a surface of the printed circuit board; and
the at least one opening is defined by a slot extending parallel or substantially parallel to the surface of the printed circuit board with a portion of the electrically conductive insulation displacement contacts being located directly between the slot and the surface of the printed circuit board.

2. The pump according to claim 1, wherein the insulation displacement contacts are soldered to the printed circuit board.

3. The pump according to claim 1, wherein the insulation displacement contacts are double insulation displacement contacts with two insulation displacement connection terminals.

4. The pump according to claim 3, wherein the double insulation displacement contacts are U-shaped, the at least one opening is provided in legs so that two of the slots are provided perpendicular or substantially perpendicular to a longitudinal axis of the double insulation displacement contacts.

5. The pump according to claim 4, wherein the double insulation displacement contacts are electrically contacted at ends of the legs with the printed circuit board.

6. The pump according to claim 1, wherein the winding wire end sections are pressed into respective ones of the insulation displacement contacts parallel or substantially parallel to the surface of the printed circuit board.

7. The pump according to claim 1, wherein the stator and the printed circuit board are aligned with upper and lower sides thereof parallel or substantially parallel to each other.

8. The pump according to claim 1, wherein the winding wire end sections extend exclusively in the radial direction and in a direction parallel or substantially parallel with the axis of rotation.

9. A method of electrically contacting a stator of an electric motor of a pump with a printed circuit board, the stator including a stator core and coils wound on the stator core, and the windings being formed of a winding wire including winding wire end sections and the winding wire end sections extend parallel or substantially parallel to the longitudinal axis of the pump, the method comprising:
bending the winding wire end sections outward in the radial direction to the longitudinal axis;
placing the stator above a surface of the printed circuit board, with the printed circuit board and the stator aligned with their upper and lower sides parallel or substantially parallel to each other;
inserting ends of the winding wire end sections into electrically conductive insulation displacement contacts on the printed circuit board from a circumferential direction of the stator, the electrically conductive insulation displacement contacts being provided on the surface of the circuit board; and
pressing the ends of the winding wire end sections into insulation displacement contacts on the circuit board parallel or substantially parallel to the surface of the circuit board with a portion of the electrically conductive insulation displacement contacts being located directly between the slot and the surface of the printed circuit board.

10. The method according to claim 9, wherein that the pressing is carried out using a two-part pressing-in tool, two tool parts of which are fed from one side each onto a double insulation displacement contact element to provide simultaneous pressing-in of two winding wire end sections of a common phase.

11. The method according to claim 9, wherein fastening of individual phases is performed by rotating a stator mounting assembly relative to the press-fit tool.

12. An electric motor comprising:
a stator centered about an axis of rotation of the electric motor, the stator including a stator core and coils wound on the stator core; wherein
the windings are defined by a winding wire including winding wire end sections electrically contacted with a printed circuit board on an end surface through electrically conductive insulation displacement contacts;
the electrically conductive insulation displacement contacts and the stator core are being arranged above a surface of the printed circuit board;
the insulation displacement contacts each include at least one opening for insertion of a winding wire end section; and
the at least one opening is a slot extending parallel or substantially parallel to the surface of the printed circuit board with a portion of the electrically conductive insulation displacement contacts being located directly between the slot and the surface of the printed circuit board.

13. The electric motor according to claim 12, wherein the insulation displacement contacts are soldered to the printed circuit board.

14. The electric motor according to claim 12, wherein the insulation displacement contacts are double insulation displacement contacts with two insulation displacement connection terminals.

15. The electric motor according to claim 14, wherein the double insulation displacement contacts are U-shaped, the at least one opening being defined in legs so that two of the slots are provided perpendicular or substantially perpendicular to longitudinal axes of the double insulation displacement contacts.

16. The electric motor according to claim 14, wherein the double insulation displacement contacts are electrically contacted with ends of the legs with the printed circuit board.

17. The electric motor according to claim 12, wherein the winding wire end sections are pressed into respective ones of the insulation displacement contacts parallel or substantially parallel to the surface of the printed circuit board.

18. The electric motor according to claim 12, wherein the stator and the printed circuit board are aligned with upper and lower sides thereof parallel or substantially parallel to each other.

19. The electric motor according to claim 12, wherein the winding wire end sections extend exclusively in a radial direction and in a direction parallel or substantially parallel to an axis of rotation.

20. A method of electrically contacting a stator of an electric motor to a printed circuit board, the stator including a stator core and coils wound on the stator core, and the windings being formed of a winding wire including winding wire end sections extending parallel or substantially parallel to a longitudinal axis of the electric motor, the method comprising:
   bending the winding wire end sections outward in a radial direction to the longitudinal axis;
   placing the stator above a surface of the printed circuit board, with the printed circuit board and the stator being aligned with upper and lower sides parallel or substantially parallel to each other;
   inserting ends of the winding wire end sections into electrically conductive insulation displacement contacts on the printed circuit board from a circumferential direction of the stator, the electrically conductive insulation displacement contacts also being provided on the surface of the circuit board; and
   pressing the ends of the winding wire end sections into insulation electrically conductive insulation displacement contacts on the circuit board parallel or substantially parallel to the surface of the circuit board with a portion of the electrically conductive insulation displacement contacts being located directly between the slot and the surface of the printed circuit board.

21. The method according to claim 20, wherein the pressing is carried out through a two-part pressing-in tool, two tool parts of which are fed from one side each onto a double insulation displacement contact to provide simultaneous pressing-in of two winding wire end sections of a common phase.

22. The method according to claim 20, wherein the fastening of individual phases is effected by rotating the stator mounting assembly relative to the press-fit tool.

* * * * *